(12) United States Patent
Crawford et al.

(10) Patent No.: US 11,988,127 B2
(45) Date of Patent: May 21, 2024

(54) GAS FLOW TREATMENT UNIT WITH TURBULENCE GENERATION

(71) Applicant: Advanced Technology Emission Solutions Inc., Toronto (CA)

(72) Inventors: Robin Crawford, Carlisle (CA); John Douglas, Brantford (CA)

(*) Notice: Subject to any disclaimer, the term of this patent is extended or adjusted under 35 U.S.C. 154(b) by 0 days.

(21) Appl. No.: 17/511,523

(22) Filed: Oct. 26, 2021

(65) Prior Publication Data

US 2022/0127989 A1 Apr. 28, 2022

Related U.S. Application Data

(60) Provisional application No. 63/224,699, filed on Jul. 22, 2021, provisional application No. 63/105,727, filed on Oct. 26, 2020.

(51) Int. Cl.
*F01N 3/00* (2006.01)
*F01N 3/20* (2006.01)
*F01N 3/28* (2006.01)

(52) U.S. Cl.
CPC ......... *F01N 3/2013* (2013.01); *F01N 3/2892* (2013.01); *F01N 2240/16* (2013.01); *F01N 2240/20* (2013.01); *F01N 2450/22* (2013.01)

(58) Field of Classification Search
CPC .. F01N 3/2013; F01N 3/2892; F01N 2240/16; F01N 2240/20; F01N 2450/22; F01N 3/2828
See application file for complete search history.

(56) References Cited

U.S. PATENT DOCUMENTS

| 10,677,126 | B2* | 6/2020 | Schlipf | H05B 3/48 |
|---|---|---|---|---|
| 10,961,887 | B2* | 3/2021 | Huang | F02D 41/0235 |
| 2005/0069485 | A1* | 3/2005 | Jung | B01J 8/048 |
| | | | | 423/651 |
| 2008/0028753 | A1* | 2/2008 | Wagner | F01N 3/0238 |
| | | | | 60/295 |
| 2015/0075138 | A1* | 3/2015 | Crawford | F01N 3/2013 |
| | | | | 60/274 |
| 2017/0014763 | A1* | 1/2017 | Crawford | B01D 53/94 |
| 2017/0014764 | A1* | 1/2017 | Crawford | F01N 3/027 |
| 2017/0014765 | A1* | 1/2017 | Crawford | F01N 3/2013 |
| 2017/0022868 | A1* | 1/2017 | Crawford | F01N 9/00 |
| 2017/0218823 | A1* | 8/2017 | Crawford | F01N 3/2026 |
| 2018/0185789 | A1* | 7/2018 | Crawford | F01N 13/0097 |
| 2021/0156289 | A1* | 5/2021 | Kurpejovic | F01N 3/2013 |

* cited by examiner

*Primary Examiner* — Matthew T Largi
(74) *Attorney, Agent, or Firm* — Bhole IP Law; Anil Bhole; Marc Lampert (57) ABSTRACT

An assembly for induction heating an exhaust gas flow includes a substrate and linear cells for the flow of the gas through the substrate from a front end of the substrate body to a back end. Metal members such as pins or wires have linear supporting parts projecting from a front end of the substrate into front-end parts of the cells. The metal members have turbulence-inducing part to generate turbulence in the exhaust gas flowing into the cells and through the substrate. The turbulence-inducing parts are integral with respective linear supporting parts and extend away from the substrate. Configurations of an induction heating coil and a magnetic flux concentrator are adapted for the particular location and form of the pins.

13 Claims, 7 Drawing Sheets

GAS FLOW TREATMENT UNIT WITH TURBULENCE GENERATION

CROSS REFERENCE TO RELATED PATENTS

The present application is related to U.S. patent Ser. No. 10/941,686 (Gaseous emissions treatment structure and method for induction heating) and to U.S. patent Ser. No. 10/918,994 (Induction heating apparatus and methods) which patents are hereby incorporated by reference in their entirety and made part of the present application for all purposes.

FIELD OF THE INVENTION

This invention relates to structures and methods of operation of gas flow treatment units such as catalytic converters, particulate filters (PFs), selective catalytic reduction (SCR) units, and the like structures for treating exhaust gases to reduce harmful pollution. The invention has particular but not exclusive application to reducing pollution from internal combustion engines at start-up and when idling.

BACKGROUND

Inductively heated metal in the channels or cells of substrates used in catalytic converters or other emissions treatment devices produce elevated temperature in the substrate near occupied and neighboring channels. Thermal transfer from the cell walls to gaseous emissions passing though the substrate channels or cells during operation of the emissions treatment device decreases the time for catalytic reactions to take place, resulting in quicker reduction of noxious content in treated gaseous emissions exiting the substrate.

An hourglass distribution of inductively heated metal pins provides efficient heat generation with the most intense heat generated in a middle zone and with this hot spot shifting longitudinally rearwardly along the substrate when, in operation, exhaust gas flows through the substrate cells.

For effective catalysis-accelerated emissions treatment reactions, it may be preferable to generate heat at or near the substrate front face, or even to preheat incoming gaseous emissions flow before it enters channels of the ceramic substrate. However, a pin or other metal form that is fully contained within a substrate cell limits the heating effect to positions along the length of the substrate and may also result in a less-than-ideal heating profile along the substrate.

An alternative structure for inductively heating pins or wires has some or all of the pins protruding from the channels at the front end of the substrate. By having such pin protrusions, catalysis reactions may occur over a greater part of the substrate length. Of additional advantage, many exhaust gas treatment reactions are exothermic. By generating heat at or immediately preceding the front end of the substrate, the period before onset of exothermicity can be reduced resulting in a desired "light-off" temperature being reached more quickly. This enables the induction heating system to be turned off earlier, thereby saving power before a subsequent induction heating boost is needed. The protrusions can have various configurations based on requirements for heating the exhaust gas flow. By the present invention induction heated protruding pin technology causes the gas flow to be changed from a laminar state to a turbulent state and provides increased thermal transfer to the airflow before it enters the ceramic substrate channels.

SUMMARY OF THE INVENTION

According to one aspect of the invention, there is provided an assembly for heating an exhaust gas flow comprising a substrate body a plurality of linear cells for the flow of the gas through the substrate body from a front end of the substrate body to a back end thereof, a metal member having a linear supporting part, at least a portion of the linear supporting part projecting into from a front end of the substrate into a front-end part of one of the cells, the metal member having a turbulence-inducing part to generate turbulence in the exhaust gas flowing into the cells and through the substrate, the turbulence-inducing part integral with the linear supporting part and extending away from the substrate.

In one embodiment, the pin protrusion is shaped as a spiral. The amount of preheating for a spiral protrusion is greater than that of a linear pin protrusion—other things being equal—because both the interfacial cross-sectional area and the interaction surface area of a spiral protrusion are higher than those of a linear protrusion. Power delivered to these protruding pins is controlled by the location of the induction coil and the MFC relative to the protrusions.

BRIEF DESCRIPTION OF THE DRAWINGS

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
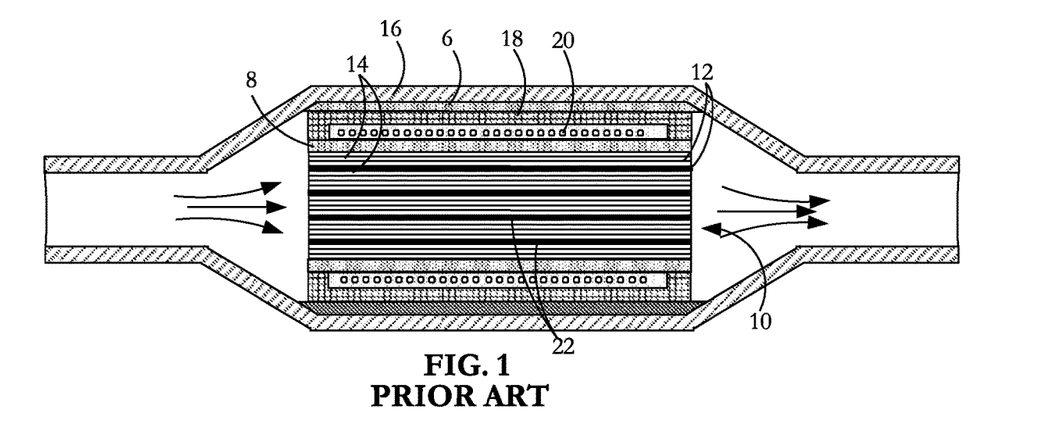
FIG. 1, marked PRIOR ART, is a longitudinal sectional view of a gaseous emissions treatment unit configured for induction heating.
Figure 2:
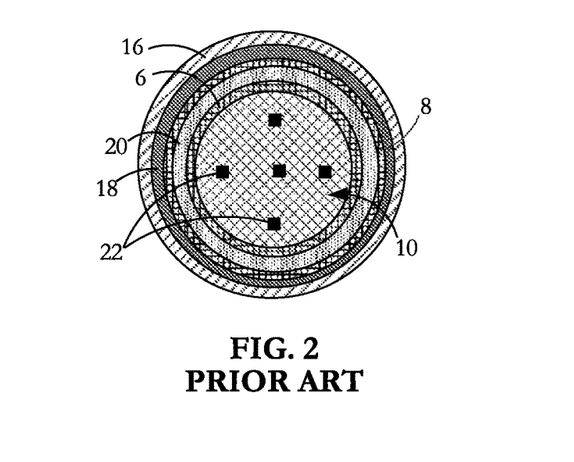
FIG. 2 is a cross-sectional view of the unit of FIG. 1.

Referring in detail to FIGS. 1 and 2, a gaseous emissions treatment assembly has a cylindrical substrate body 10 made of ceramic material. The substrate has a honeycomb structure in which a number of small area passages or cells 12 extend the length of the substrate, the cells 12 being separated by walls 14. There are typically from 400 to 900 or more cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material is extruded through an appropriately shaped die and units are cut successively from the extrusion, the units being then cut into lengths called bricks. The areal shape of the cells or passages 12 may be whatever is convenient for contributing to the overall strength of the substrate body 10 while presenting a large contact area at which flowing exhaust gases can interact with a hot catalyst coating the interior walls of the cells. In other gaseous emissions treatment such as particulate filters (PFs), there may or may not be catalyst coating on the passage walls. In particulate filters, a checkerboard subset of cells has their front ends plugged, a 'reverse' checkerboard subset of cells has their back ends plugged, and gaseous emissions are treated by being driven though porous walls of the honeycomb structure from cells of the first subset into cells of the reverse subset. In this specification, the terms "passages" and "channels" are used and intended to have much the same meaning as "cells". Cells may be of the straight-through form known in catalytic converters or may be of the checkerboard type used in PFs.

Surrounding the ceramic substrate body 10 is a metal coil 20 and located within selected ones of the cells 12 are metal pins, rods, wires or other metal inserts 22. By generating a varying electromagnetic field at the coil 20, a chain reaction is initiated, the end result of which is that after start-up of a vehicle equipped with an exhaust system embodying the invention, 'light-off' temperature may be attained more quickly in the presence of the varying electromagnetic induction field than if there were no such field. In a chain reaction: the varying electromagnetic field induces eddy currents in the metal elements 22; the eddy currents cause heating of the metal elements; heat from the metal elements 22 is transferred to the ceramic substrate body 10; heat from the heated substrate body 10 is transferred to exhaust gas as it passes through the emissions control unit; and the heated exhaust gas causes catalytic reactions to take place more quickly at the walls 14 compared to unheated exhaust gas. Conduction from the heated wires, pins or other filling elements 22 is the primary source of heat transfer to the ceramic substrate 10 and therefore to the exhaust gases when the emissions unit is in operation. There is also convective and radiated heat transfer at any small air gaps between a wire and the interior surface of the cell within which it is contained. Other elements of the structure include an outer fibrous, insulation matting layer 6, an inner fibrous, insulation matting layer 8 and a sheet metal jacket 16 collapsed down onto the assembly.

Figure 3:
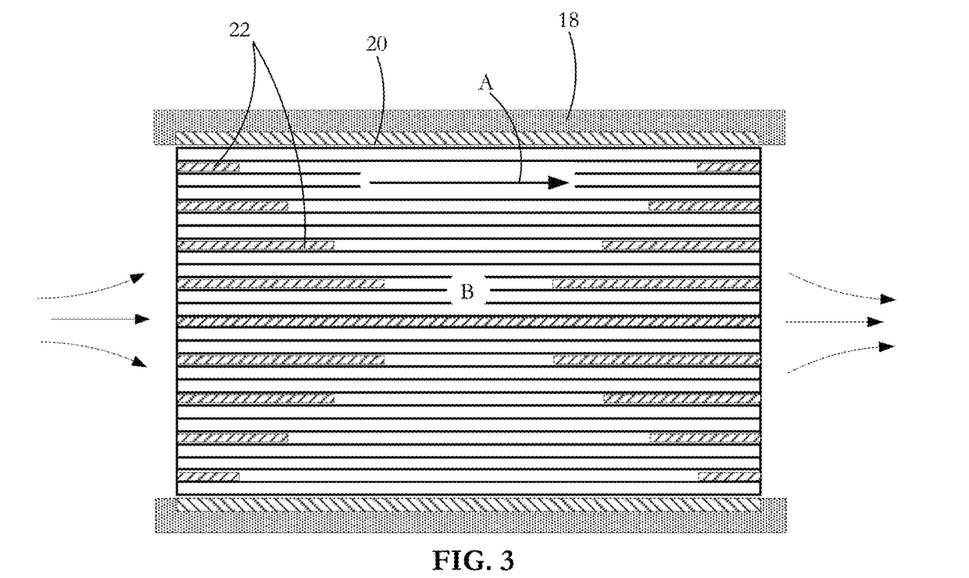
FIG. 3, marked PRIOR ART, is a longitudinal section through an emissions treatment device showing a distribution of induction heating pins.

FIG. 3 shows an 'hourglass' distribution of induction heating metal pins 22, which distribution provides relatively efficient induction heat generation with the most intense heat generated in a middle zone B and with this hot spot shifting longitudinally rearwardly (direction A) along the substrate when, in operation, exhaust gas flows through the substrate cells 12. In the modification shown in FIG. 4, the pin distribution is shifted forward from the longitudinal midline of the substrate 10 so that linear pin protrusions 24 extend forwardly from the substrate front face 26 and the pin back ends 28 are set forward from the substrate back face 30. The surrounding induction coil 20 and magnetic flux concentrator (MFC) 18 are similarly shifted forwardly so as generally to track the longitudinal positions of the pin protrusions 24. When the FIG. 4 arrangement is energized, the hot spot, B, is located forwardly of the substrate longitudinal midline by a distance roughly equal to the shift of the pins 22, coil 20 and MFC 18. As well as bringing more heat towards the substrate front face 26, the flowing exhaust gas is preheated as it passes by the wire protrusions 24.

Figure 4:
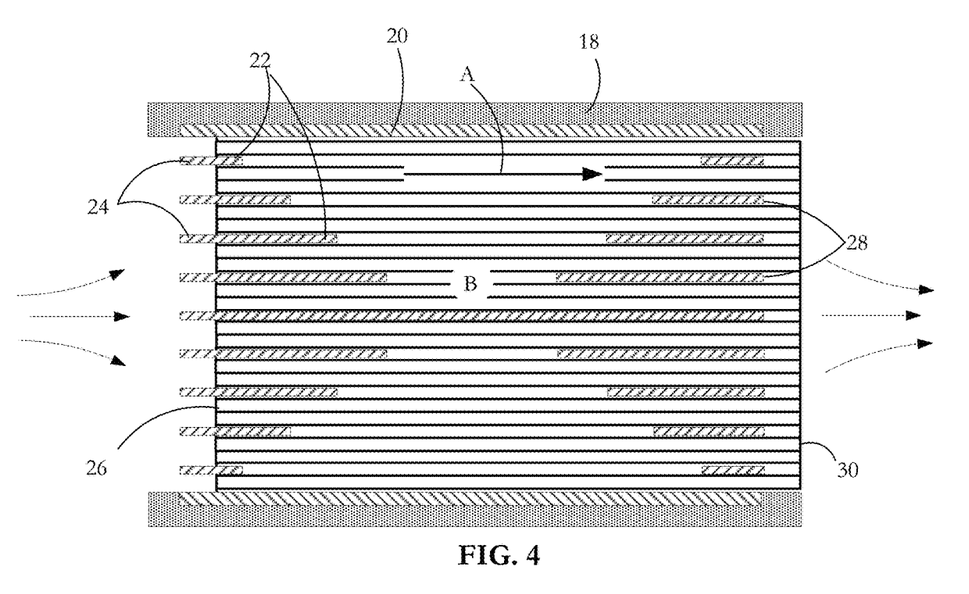
FIG. 4 is a longitudinal section similar to that of FIG. 3, but showing a distribution of the induction heating pins that is shifted forward to expose the ends of heating pins at the front of the device.

That preheating of the linear pin protrusions 24, aligned as they are with the axes of the cells 12, is quite small, owing to the small interfacial cross-section of the protrusions 24 encountered by the exhaust flow and owing, also, to the laminar nature of exhaust flow which results in a low interaction area of exhaust gas with the sides and ends of the linear protrusions 24.

Referring to FIGS. 5 through 12, alternative embodiments of pin protrusion are shown, these being shaped to generate turbulence in an exhaust gas flow as it passed around the protrusions and their constituent elements before entering and passing along those of the cells 12 that do not accommodate pins 22 or other metal elements. The turbulence-inducing parts are either or both of (a) non-linear and (b) extending at an angle to the cell axes.

Figure 5A:
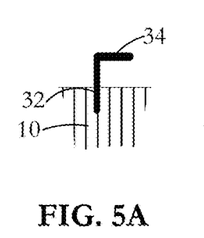
FIGS. 5 through 12 show a number of configurations of inductively heated metal wire for disrupting laminar flow and introducing turbulence into a gaseous emissions flow, each of the configurations for deployment in assemblies according to embodiments of the invention.
Figure 5B:
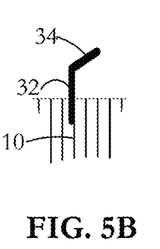
Figure 5C:
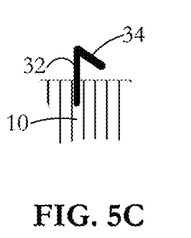
Figure 5D:
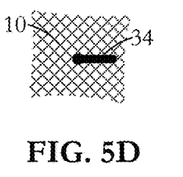

FIG. 5A shows a pin having a linear supporting part 32 projecting into one of the cells 12 and a turbulence-inducing part 34 which is linear but which extends at a right angle to the axes of the substrate 10 and the cells 12. FIG. 5B shows a pin having a linear supporting part 32 projecting into one of the substrate cells and a turbulence-inducing part 34 which is linear but which extends at an obtuse angle to the substrate and cell axes. FIG. 5C shows a pin having a linear supporting part 32 projecting into one of the substrate cells and a turbulence-inducing part 34 which is linear but which extends at an acute angle to the substrate and cell axes. FIG. 5D shows, for each of FIGS. 5A, 5B and 5C, the appearance of the turbulence-inducing part 34 viewed from a direction in front of the substrate 10 and looking back at a small part of the substrate front face 26. In alternative configurations of the FIGS. 5A, 5B and 5C embodiments, the turbulence inducing parts are curved (not shown).

Figure 6A:
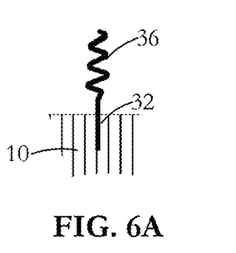
Figure 6B:
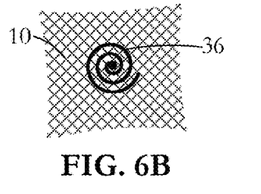

FIG. 6A shows a pin having a linear supporting part 32 projecting into a cell 12 and a turbulence generator part 36 which is in the form of an elongate 'pigtail' like coil, the coil having its axis parallel to the substrate and cell axes. The corresponding end view is shown in FIG. 6B.

Figure 7A:
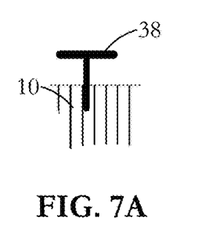
Figure 7B:
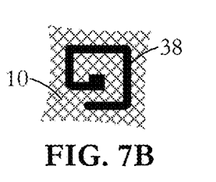

FIGS. 7A and 7B show a pin having a turbulence generator part 38 in the form of a square spiral, the centre of the spiral being integral with a linear supporting part 32 projecting into one of the cells. The spiral extends in a plane perpendicular to the axes of the substrate and the cells. In alternative embodiments, (a) the spiral plane can be set at an angle to these axes and/or (b) the spiral can be supported by several spaced linear supporting parts projecting into respective cells.

Figure 8A:
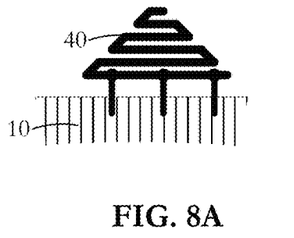
Figure 8B:
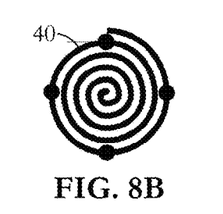

FIGS. 8A and 8B shows a pin having a turbulence generator part 40 which is a 3D spiral contained in a notionally conical envelope, the spiral having several linear supporting parts 32 to provide cross spiral support.

Figure 9A:
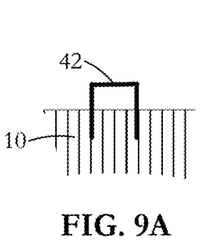
Figure 9B:
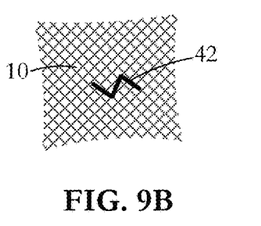

FIGS. 9A and 9B show a 'staple' pin formation having spaced linear supporting parts projecting into spaced cells. The turbulence generator part 42 is a wire connecting the two legs, the wire 42 being of zig zag form extending in a plane perpendicular to the cell axes. The non-linear configuration of the connecting wire 42 is valuable in that (a) it provides greater turbulence than a linear wire and (b) it can accommodate longitudinal expansion and contraction without overly stressing the legs as the gas treatment device, in use, cycles through high and low operating temperatures.

Figure 10A:
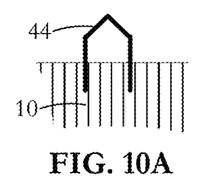
Figure 10B:
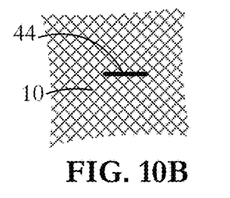

The embodiment of FIGS. 10A and 10B is similar to the prior embodiment, except that the distance of the connecting wire 44 from the substrate front face varies along the wire length.

Figure 11A:
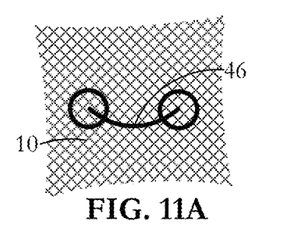
Figure 11B:
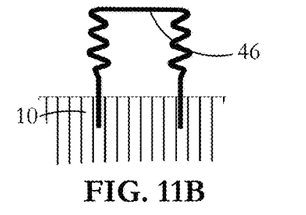

In a variation of the FIG. 9A embodiment shown in FIGS. 11A and 11B, two of the coil pins shown in FIG. 6A are joined by a connecting wire 46.

Figure 12A:
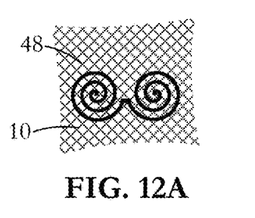
Figure 12B:
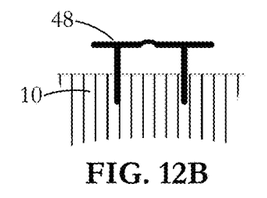

The embodiment of FIGS. 12A and 12B has a turbulence-inducing part 48 comprising two planar spirals joined by a short connecting wire and having linear supporting legs extending into spaced cells.

Figure 23A:
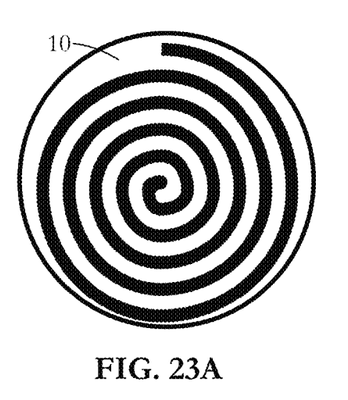
FIG. 23A is an end view of one configuration of inductively heated metal wire for disrupting laminar flow and introducing turbulence into a gaseous emissions flow, the configuration for deployment as a single element spanning a substrate front end in an assembly according to an embodiment of the invention.
Figure 23B:
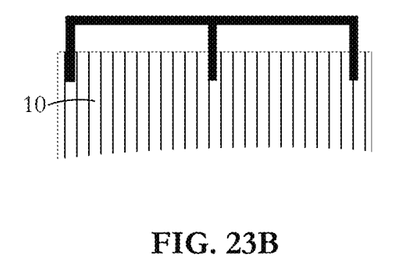
FIG. 23B is a side view of the configuration of FIG. 23A.
Figure 24A:
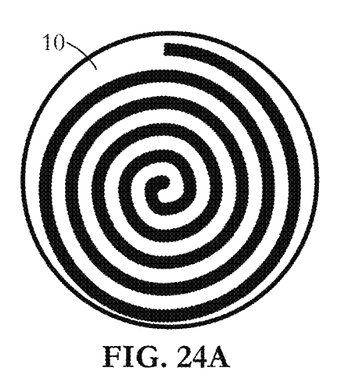
FIG. 24A is an end view of another configuration of inductively heated metal wire for disrupting laminar flow and introducing turbulence into a gaseous emissions flow, the configuration for deployment as a single element spanning a substrate front end in an assembly according to an embodiment of the invention.
Figure 24B:
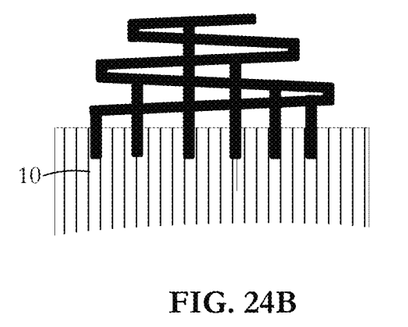
FIG. 24B is a side view of the configuration of FIG. 24A.
Figure 25A:
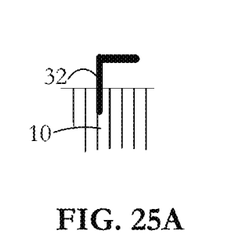
FIG. 25A is a side view of a further configuration of inductively heated metal wire for disrupting laminar flow and introducing turbulence into a gaseous emissions flow according to an embodiment of the invention.
Figure 25B:
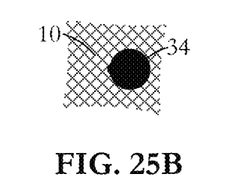
FIG. 25B is an end view of the configuration of FIG. 25A.
Figure 26A:
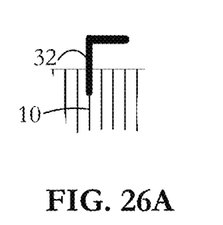
FIG. 26A is a side view of a further configuration of inductively heated metal wire for disrupting laminar flow and introducing turbulence into a gaseous emissions flow according to an embodiment of the invention.
Figure 26B:
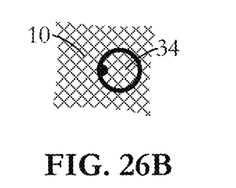
FIG. 26B is an end view of the configuration of FIG. 26A.

In the embodiments shown in FIGS. 23 and 24, protruding pins are laser welded to a flat continuous spiral wire (FIG. 23) and to a continuous spiral wire cone. In each case, the wire configuration spans practically the full front face of the substrate 10. The continuous wire spiral elements of FIGS. 23 and 24 can be energized to provide high induction field leading in turn to high temperatures in the wire at reasonable applied power levels. The embodiments of FIGS. 25 and 26 show turbulence enhancers which are disc shaped (FIG. 25) and annulus shaped (FIG. 26).

In many of the examples of turbulence generator illustrated previously, the structure can be manufactured by appropriately shaping a single wire or pin. Especially, for the more complex forms, the turbulence generators are alternatively manufactured by welding a part or parts of the turbulence generator to each other and to a supporting leg or legs.

In the configuration shown in FIG. 3, where linear pins 22 extend to the front face of the substrate but no further, the energizing coil 20 and magnetic flux concentrator (MFC) 18 are longitudinally co-extensive with the substrate 10. In fact, the MFC 18 is slightly longer than the coil 20 at its ends in order to limit the amount of e.m. flux directed out of the ends of the assembly and to, instead, direct it back towards the induction heating pins 22. In the configuration of FIG. 4, which has frontal pin protrusions 24, the coil/MFC combination is simply moved forward generally to embrace the pins protrusions 24. Other configurations of coil and MFC position and orientation are possible with a view to modifying induction heating of a turbulence inducing pin part and an adjacent linear pin supporting or seating part.

In operation of the FIG. 3 structure, pins in radially outer positions tend to get hotter than pins in radially inner positions. In operation of the FIG. 4 structure, if the front ends of the pins are coplanar, heating is relatively inefficient and, again, outer pins get hotter than inside pins. While a collective domed profile of pin front ends improves heating of the inner pins, the longer unsupported pins may suffer durability issues. In addition, the coil/MFC combination may be directly exposed to incoming hot gases and is itself unsupported.

The embodiments illustrated in FIGS. 13 to 22 show coil 20 and MFC 18 with variations of size, position and orientation. FIGS. 13 to 20 show induction heating pins 22 in which the turbulence generator is in the form of the elongate 'pigtail' like coil of FIG. 6, but the coil-type generator is exemplary only and the embodiments can be alternatively implemented using any of the other turbulence generators illustrated in FIGS. 5 to 12 or using functional variations thereof.

Figure 13:
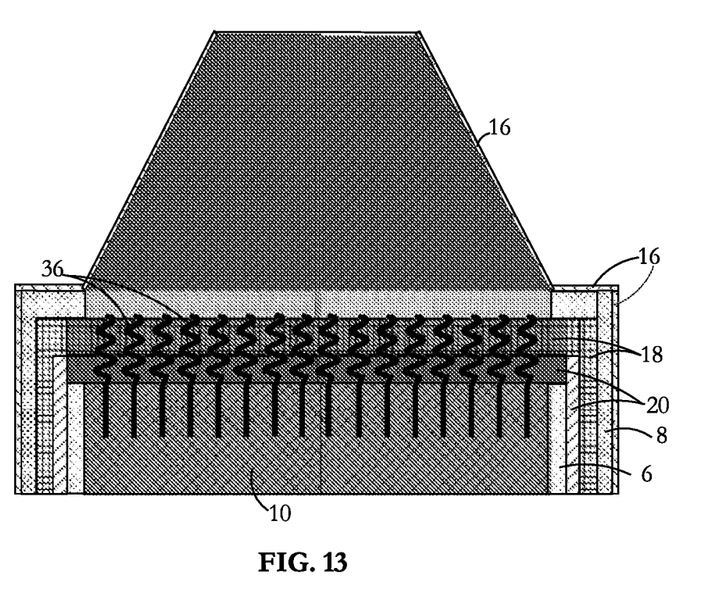
FIG. 13 is a sectional view through the front end of an emissions treatment device showing the use of induction heating pins having spiral front end parts for creating turbulence in a gas flow, according to one embodiment of the invention.

In the structure illustrated in FIG. 13, the front end of the induction coil 20 is set back from the forward ends of the spirals 36, with the MFC 18 surrounding the pin linear sections 32 and part of the pin spiral sections 36. With the induction coil 20 and MFC 18 positioned as shown, a magnetic field is generated which has a field intensity varying from a relatively high level at radially outer regions of the substrate 10 to a relatively low level at a radially central region of the substrate. In operation, there is some slight MFC focusing of generated magnetic flux over part of the spiral sections 36. In general, heating energy absorbed by a spiral section 36 is less than that of the corresponding linear section for two reasons. Firstly, for a particular wire material and gauge, a spiral configuration absorbs less energy than a linear configuration over the same axial length. Secondly, over that axial length, the spiral section has greater mass than a linear section.

Figure 14:
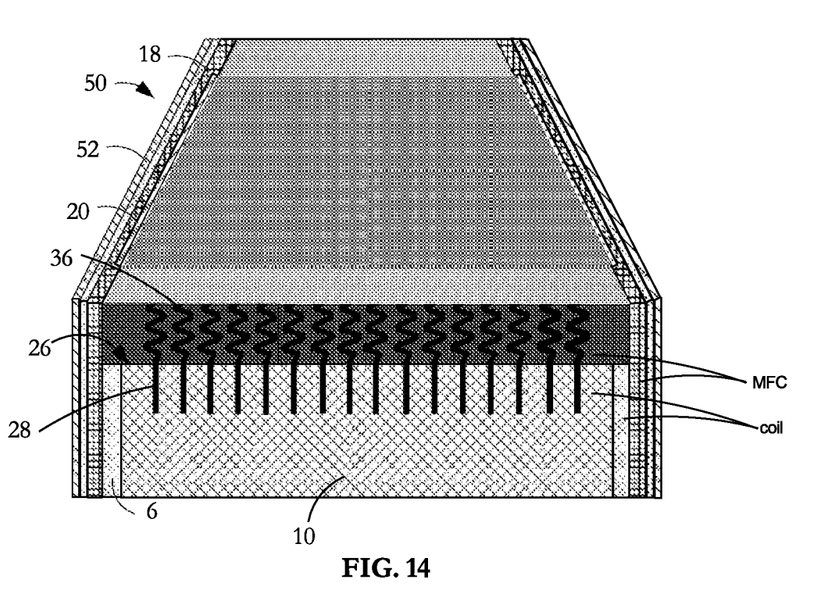
FIG. 14 is a sectional view through the front end of an emissions treatment device showing the use of induction heating pins having spiral front end parts for creating turbulence in a gas flow, according to another embodiment of the invention.

In the embodiment of FIG. 14, the induction coil 20 and the MFC 18 are located in a front conical part 50 of the emissions treatment unit housing 52. There is no overlap of the coil 20 and pin spiral sections 36 in the longitudinal or axial direction. Placement of the coil 20 and MFC 18 in the cone 50 moves them further upstream of the gas flow compared with the embodiment of FIG. 3. One advantage of this design is that the maximum outside diameter of the induction heating component (IHC) is reduced compared with a unit in which the coil 20 and MFC 18 surround the substrate 10. This, in turn, facilitates packaging of the IHC; for example, in a space-limited engine bay.

In an alternative embodiment (not shown), the lengths of the pin straight sections are increased to shift some or all of the leading spiral ends forwardly, thereby to create a more uniform gap between the spiral sections and the coil so as, in operation, to increase heating of more centrally located pins. In this arrangement, the ends of the pin spiral sections, collectively, have a domed or other non-planar formation depending on desired heating effects. One mechanical drawback of a collective domed profile is that near the substrate axis, outer parts of the longer pin spiral sections are less mechanically supported and so may be less durable than smaller pin protrusions. This problem may be alleviated somewhat by using a substrate with a correspondingly profiled front face or by using sturdier material for the longer protrusions.

Compared, for example, with the hourglass formations of FIGS. 3 and 4, both the FIGS. 13, 14 and the FIGS. 15, 16 designs (below) use a relatively shorter overall length of wire in which the back ends 28 of the wires extend a short distance into the substrate 10 from the front end 26 and with the coil 20 and MFC 18 generally match the pin lengths. These short pin designs, in operation, have high operating efficiency.

Figure 15:
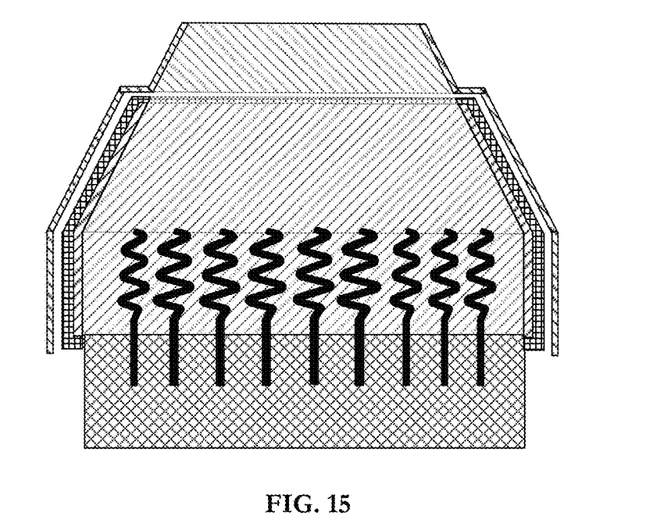
FIG. 15 is a sectional view through the front end of an emissions treatment device showing the use of induction heating pins having spiral front end parts for creating turbulence in a gas flow, according to a further embodiment of the invention.

Referring to FIG. 15, while structurally this is somewhat of a hybrid of the embodiments of FIGS. 3 and 4, it offers certain performance benefit over both. In the FIG. 15 design, the coil 20 funnels inwardly away from the substrate front end 26 resulting in shorter gaps between the pin end parts 36 and the coil 20. This somewhat obviates having to lengthen central pins to obtain even heating. Also, the coil/MFC are partially supported by the ceramic substrate, thereby benefiting durability and integrity.

In one variation of the FIG. 15 embodiment, collective dome profiling of the pin ends is adopted. In this case, heating of the pin end portions, if that is the desired heating pattern, can be achieved with a relatively flat dome. Again, the pin rear ends extend to a common plane inside the cells although some excursion from planarity can be adopted for particular heating performance requirements. In one example, with the spirals on the same plane, the energy split between the spiral section and linear section is 2:1, so 67% of heat generated is in the spiral and 33% in the linear section.

Figure 16:
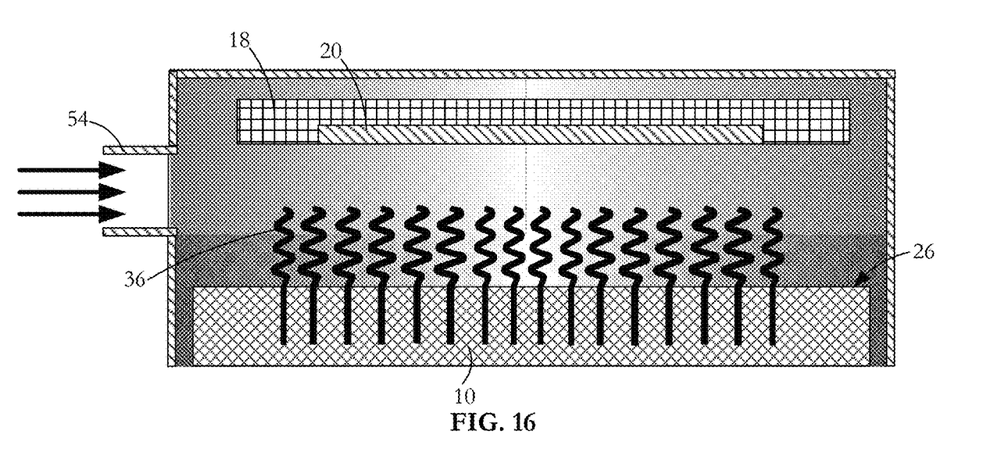
FIG. 16 is a sectional view through the front end of an emissions treatment device showing the use of induction heating pins having spiral front end parts for creating turbulence in a gas flow, according to yet another embodiment of the invention.

Referring to FIG. 16, the illustrated embodiment uses a side-entering exhaust 54. Side entering exhausts are currently used in commercially available emissions treatment products that are compact and particularly suited to aftertreatment. Some products have multiple treatment components or layers in a single package configured so that exhaust gas flow zig-zags back and forth instead of flowing longitudinally as an axial flow-through as in the structures previously described. The illustrated device has a coil 20 and an MFC 18 which, together, are in the form of a flat pancake structure. Exhaust gas enters from the side of the unit, disperses across the pin protrusions 36 at the front face 26 of the substrate 10, passes along the substrate, and then exits from the back of the substrate. In this embodiment, the coil-to-nearest pin distance is virtually constant regardless of pin position. Also, the coil 20 faces the end of the spiral 36 as opposed to facing it from the side or at some shallow angle. In operation, the center of the structure normally receives more energy than outer areas owing to the small number of pins at the center and owing to magnetic fields configured to inductively heat from both sides of the centerline. The coil inside and outside diameter can be selected to afford substantially uniform balance across the radial extent of the coil without any pin length variation being necessary. With the spiral sections 36 being on the same plane, the energy split between a spiral section and its contiguous linear section is of the order of 10:1, resulting in about 91% of the heat being generated in the spiral sections and 9% in the linear section.

Figure 17:
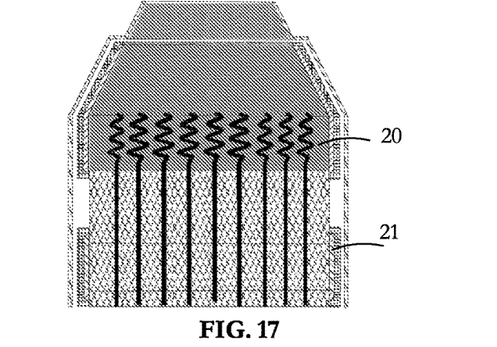
FIG. 17 is a sectional view through the front end of an emissions treatment device showing the use of induction heating pins having spiral front end parts for creating turbulence in a gas flow, according to an additional embodiment of the invention.
Figure 18:
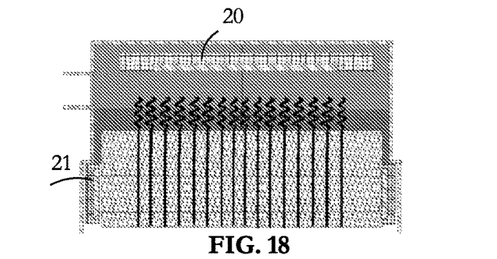
FIG. 18 is a sectional view through the front end of an emissions treatment device showing the use of induction heating pins having spiral front end parts for creating turbulence in a gas flow, according to an embodiment of the invention.
Figure 19:
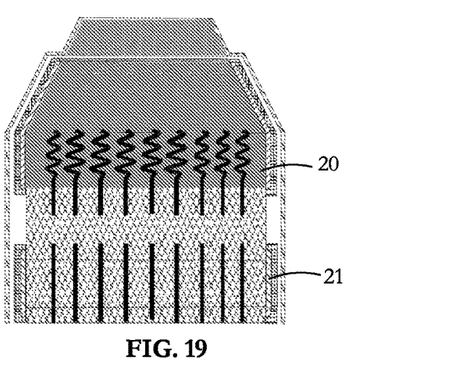
FIG. 19 is a sectional view through the front end of an emissions treatment device showing the use of induction heating pins having spiral front end parts for creating turbulence in a gas flow, according to another embodiment of the invention.
Figure 20:
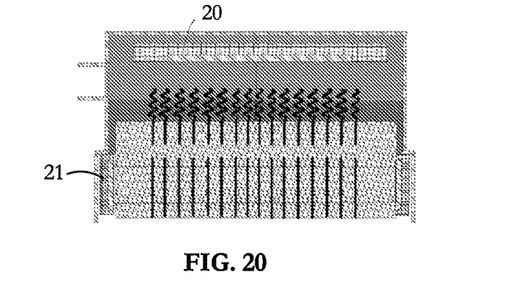
FIG. 20 is a sectional view through the front end of an emissions treatment device showing the use of induction heating pins having spiral front end parts for creating turbulence in a gas flow, according to further embodiment of the invention.

Referring to FIGS. 17 to 20, the illustrated embodiment shows a combination of spiral protrusions 36 and a pair of induction coils 20, 21 configured as a single system (FIGS. 17 and 18) and a 'split' system (FIGS. 19 and 20). In operation, these combinations provide frontal, pre-substrate heating as well as substrate heating. The use of two induction coils allows the heat profile to be varied along the length of the device during operation so as to move a hot spot or spots to where heat is wanted. The upstream coil 20 is energized to provide frontal inductive heating and the downstream coil is energized to provide inductive heating of pins within the substrate. In addition to the frontal pre-heating, at least some pre-heating of the substrate is desirable during pre-heating because some thermal mass is required to overcome the cooling effect of the cold exhaust flow. Switching to frontal heating once sufficient thermal mass has been developed at the substrate heats the incoming exhaust gas thus preventing the substrate front face from cooling below the desired light-off/catalyst reaction temperature.

In one operating configuration, the switch from substrate heating to frontal heating is made just before the starting the engine that will produce the exhaust gas to be treated. In this way, the system can be brought to an optimal temperature before cooling exhaust gas starts to flow. The coils may also be operated simultaneously to obtain combined frontal and substrate heating which may, in some operating scenarios, be preferred to dedicated heating of one coil and then of the other. The relative proportions of frontal versus substrate heating can be varied from 100% frontal and 0% catalyst substrate through a full spectrum to 0% frontal and 100% catalyst substrate heating. Running the two coils simultaneously produces a division of heating as between the two coils. The coils can alternatively be pulsed on and off based on a desired heating strategy to produce other effects. In operation, frontal heating heats the exhaust flow, following which the heated exhaust gas enters the cells of the colder catalyst or PF substrate to which heat is transferred from the gas flow. Catalyst substrate heating heats the substrate with the cooler exhaust then encountering a hotter catalyst substrate from which heat is transferred into the gas flow. The single systems of FIGS. 17 and 18 are characterized by the metal pins and the catalyst substrate being at least partly co-extensive with both coils. In contrast, the split systems of FIGS. 19 and 20 have a split or separation between the pins and coil of the frontal heater and the pins and coil of the substrate heater.

Figure 21:
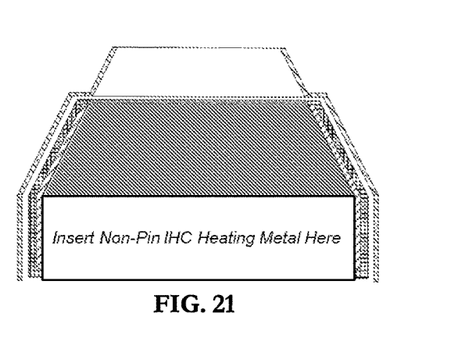
FIG. 21 is a sectional view through the front end of an emissions treatment device having an inductively heated metal mass for interception and heating a gas flow before entry to a gas flow treatment unit according to yet another embodiment of the invention.
Figure 22:
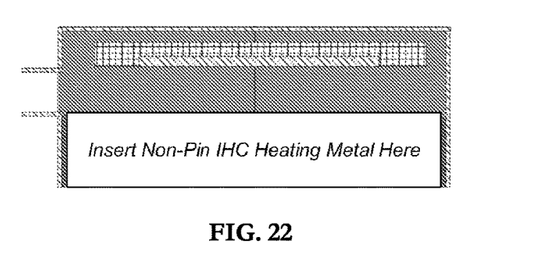
FIG. 22 is a sectional view of an alternative configuration of the FIG. 21 emissions treatment device according to an additional embodiment of the invention.

Referring to FIGS. 21 and 22, there are shown variations of the coil and MFC configurations of FIGS. 5 and 6, respectively. These each have a compartment between the substrate (not shown) and the coil/MFC. The compartment is filled with a heat medium which can be any of those described and illustrated in U.S. patent Ser. No. 10/918,994 assigned to the present assignee. The metal members described and illustrated with reference to FIGS. 5 to 12 can be looked on as equivalent to a metal matrix. In one variation of the pin protrusion 'pre-heater', the metal matrix is an inductively heated coiled, corrugated metal slice as shown in the embodiment of FIGS. 8 and 8A of U.S. Ser. No. 10/918,994. In a further embodiment, the metal matrix is a number of concentric metal blades surrounding an open hub as shown in the embodiment of FIGS. 9 and 9A of U.S. Ser. No. 10/918,994. In a further embodiment, the metal matrix is a mesh of randomly distributed metal filaments as shown in the embodiment of FIGS. 10 and 10A of U.S. Ser. No. 10/918,994. In a further embodiment, the metal matrix is a woven mesh of metal filament as shown in the embodiment of FIGS. 11 and 11A of U.S. Ser. No. 10/918,994. In a further embodiment, the metal matrix is a perforated metal plate as shown in the embodiment of FIGS. 12 and 12A of U.S. Ser. No. 10/918,994. In a further embodiment, the pre-heater insert to the compartment has a honeycomb ceramic substrate but with ceramic constituting the honeycomb walls heavily doped with metal as illustrated in the embodiment shown in FIGS. 13 and 13A of U.S. Ser. No. 10/918,994. In a further embodiment of the invention, individual pins are used together with a flat or varying-height metal matrix with the turbulent generators of the pins projecting above the front surface of the matrix.

Individual pin turbulent profiles offer the advantages of a frontal heating matrix and of individuality in that they offer flow manipulation and heat transfer of a matrix without having to be a fully integral layer/surface. Individual pins can be manufactured at a much faster rate than a full-frontal matrix profile as there are typically no secondary processes as are required on constructing an effective matrix. It is recognized however that a matrix may be (a) faster to install on a ceramic honeycomb because only one piece (or very few pieces) is needed to cover the cross-sectional span of the substrate. A single integral layer/surface matrix may in some circumstances have a durability advantage because of the unified strength in the design although pins that have a simple turbulence generator shape are durable because less mass is cantilevered from the front of the substrate. The electromagnetics are comparable in performance as between a matrix and multiple pins depending on pin density and particular matrix design. However, there is a limit on pin density because of a concomitant increase in back pressure (against the incoming exhaust gas).

Embodiments of the present invention where turbulence is generated before the substrate at pin protrusions or matrixes are of value in systems (such as SCR systems) which depend on the addition of substances to flowing exhaust gas in order to achieve faster atomization and greater reduction in noxious content of the emissions.

Other variations and modifications will be apparent to those skilled in the art and the embodiments of the invention described and illustrated are not intended to be limiting. The principles of the invention contemplate many alternatives having advantages and properties evident in the exemplary embodiments.

The invention claimed is:

1. An assembly for induction heating an exhaust gas flow comprising: a substrate, a plurality of linear cells for the flow of the gas through the substrate from a front end of the substrate body to a back end thereof, a plurality of metal members spaced apart, each metal member having a linear supporting part, at least a portion of the linear supporting part of each metal member projecting from a front end of the substrate into a front-end part of a respective one of the cells, each metal member having a turbulence-inducing part to generate turbulence in the exhaust gas flowing into the cells and through the substrate, the turbulence-inducing part integral with the corresponding linear supporting part, each turbulence-inducing part in the form of a coil extending away from a face of the substrate.

2. The assembly claimed in claim 1, wherein the turbulence-inducing part and the linear supporting part are formed from a single wire.

3. The assembly claimed in claim 1, wherein the turbulence-inducing part is welded to the linear supporting part.

4. The assembly claimed in claim 1, wherein the coil of each metal member is axially centred on the linear supporting part of the respective metal member.

5. The assembly claimed in claim 1, wherein the turbulence-inducing part of a first one of the plurality of metal members extends further from the substrate front end than the turbulence-inducing part of a second one of the plurality of metal members.

6. The assembly as claimed in claim 1, wherein the substrate has a central longitudinal axis and ends of the linear supporting parts projecting into respective cells are located in a plane perpendicular to the axis.

7. The assembly as claimed in claim 1, further comprising an induction heating coil for generating a varying electromagnetic field for inductively heating each turbulence-inducing part.

8. The assembly as claimed in claim 7, further comprising a magnetic flux concentrator located adjacent the induction heating coil for directing at least some of electromagnetic flux generated at the induction heating coil towards each turbulence-inducing part.

9. The assembly as claimed in claim 7, wherein the induction heating coil is mounted forwardly of each turbulence-inducing part.

10. The assembly as claimed in claim 7, wherein the induction heating coil is of truncated, open cone form with one end opening of the cone adjacent the front end of the substrate body and a relatively smaller other end opening spaced from said front end.

11. The assembly as claimed in claim 7, wherein the induction heating coil has a first element of truncated, open cone form and a second element of open cylinder form, the first element contiguous with the second element and located in front of the second element.

12. The assembly as claimed in claim 7, wherein the induction heating coil is of disc form and is located in front of the front end of the substrate.

13. The assembly claimed in claim 1, wherein the coil of each metal member exhibits a helical winding configuration with two terminal ends longitudinally separated from each other.

\* \* \* \* \*